INVENTORS
BRADFORD DUNHAM
JOHN C. SLONCZEWSKI
BY Joseph J. Connerton
ATTORNEY

Sept. 29, 1964 B. DUNHAM ETAL 3,151,315

MAGNETIC FILM LOGICAL BIAS DEVICE

Filed April 19, 1957 4 Sheets-Sheet 2

MAGNETIC FILM LOGICAL BIAS DEVICE

MAGNETIC FILM LOGICAL BIAS DEVICE

Filed April 19, 1957

4 Sheets-Sheet 4

United States Patent Office 3,151,315

Patented Sept. 29, 1964

3,151,315

MAGNETIC FILM LOGICAL BIAS DEVICE

Bradford Dunham, Poughkeepsie, and John C. Slonczewski, Wappingers Falls, N.Y., assignors to International Business Machines Corporation, New York, N.Y., a corporation of New York Filed Apr. 19, 1957, Ser. No. 654,035

13 Claims. (Cl. 340—174)

The present invention is directed toward logical devices and more particularly toward multipurpose logical devices of thin magnetic film.

One of the major problems encountered in the design and construction of information handling machines relates to the internal routing of information. Such information, in the form of electric signals, is generally guided through the desired circuit paths by means of logical or switching circuits. The type and number of such circuit required is one of the prime considerations determining the size and complexity of a particular data processing machine or computer. If a large variety of logical circuits or elements are utilized, the number of logical elements required to achieve a given logical relationship will be comparatively small. However, this arrangement limits the standardization of basic logical elements by requiring individual logical devices for each logical operation. Alernatively, if a limited number of logical elements are utilized the number of such elements required to achieve different logical relationships other than the express logical relationship for which it is designed will be comparatively large. This approach is undesirable in that considerable excess equipment in the form of basic logical elements may be required to provide more complex logical relationships.

From the description it will be appreciated that the above enumerated approaches of the prior art appear contradictory, in that either a substantial number of different logical circuits or a large number of logical elements each capable of directly achieving only a single logical relationship must be provided. In the latter situation, other logical relationships are provided by synthesis of the single function logical elements.

In accordance with the present invention there is provided a multipurpose logical device capable of directly achieving a wide variety of logical relationships. When employed as building blocks, complex logical relationships can be achieved by judicious combinations of the multipurpose logical devices. Thus numerous logical relationships for a given information handling system can be provided by a single multipurpose logical device.

The subject invention employs thin magnetic film having unique characteristics particularly adaptable to multipurpose logical devices.

Thin magnetic film is a metallic alloy having a normal magnetic orientation along an axis known as the axis of easy magnetization, and switches from one direction to the other along this axis by rotation. In the presence of a magnetic field having a direction substantially transverse to the axis of easy magnetization, the normal switching threshold of the thin film is substantially reduced.

The present invention comprises a strip of thin magnetic film and a plurality of coils for generating magnetic fields along the axis of easy magnetization and transverse thereto. These coils are selectively energized by pulse sources representing the logical variable or bias sources. This arrangement functions as a multipurpose logical device wherein the intensity and direction of the magnetic fields produced by the input variables specifies the logical operation to be performed and the direction of magnetization of the thin film defines the logical resultant. The multipurpose logical device may be utilized as a singularly, binary, ternary or quaternary logical device directly, or by syntesis may be employed in more complex logical systems.

Accordingly, a primarly object of the present invention is to provide logical circuits utilizing thin magnetic film.

Another object of the present invention is to provide from a logical standpoint a multipurpose type of information handling component.

Another object of the present invention is to provide logical bias devices of thin magnetic film.

Another object of the present invention is to employ the characteristics of thin magnetic film to perform and control logical operation in a multipurpose logical device.

Another object of the present invention is to provide multipurpose logical devices utilizing thin magnetic material wherein the variation of the excitation threshold of the magnetic material under the influence of a transverse field is utilized to perform and control logical operations.

Another object of the present invention is to provide singularly, binary, ternary and quaternary logical devices of thin magnetic film.

A further object of the present invention is to provide a class of switching devices of thin magnetic film, each of which class may in turn provide a variety of logical functions.

A further object of the present invention is to provide a class of logical switching devices of thin magnetic film having two orthogonal axes and associated control means, the control means indicating the logical function to be performed and the direction of magnetization along one of the orthogonal axes indicating the logical result.

Another object of the present invention is to provide a thin magnetic film multipurpose logical device wherein the logical function to be performed is controlled by selective biasing of the multiple inputs associated with said devices and the logical resultant of the operation is indicated by the direction of magnetization along the axis of easy magnetization of the film.

A related object of the present invention is to provide an improved multipurpose logical device employing thin magnetic film having an axis of easy magnetization wherein the direction of magnetization along the axis is selectively and collectively controlled by the inputs to the logical device to perform a particular logical operation.

Another related object of the present invention is to provide a class of switching devices of thin magnetic film having an axis of easy magnetization and an axis transverse to the axis of easy magnetization wherein the selective and collective application of magnetomotive forces along said axes enables said switching device to function as one of a plurality of logical circuits.

Another object of the present invention is to provide a class of logical devices of thin magnetic film, each device in the class capable of performing a plurality of logical functions wherein magnetic fields are collectively and selectively applied in four directions and at varying amplitudes to thereby control the logical function to be performed.

Another object of the present invention is to provide a class of multiple-input switching devices of thin magnetic film wherein the selective biasing and application of variables to the multiple inputs of the devices provide an output indicative of the logical operation performed.

Still another object of the present invention is to provide a multipurpose logical circuit including an element of thin magnetic film having an axis of easy magnetization and substantally rectangular hysteresis characteristics wherein the hysteresis characteristics are selectively modified in accordance with the logical function to be performed while the direction of magnetization along the axis of easy magnetization indicates the resultant logical output.

Other objects of the invention will be pointed out in the following description and claims and illustrated in the accompanying drawings, which disclose, by way of example, the principle of the invention and the best mode, which has been contemplated, of applying that principle.

Figures 1, 4, 6:
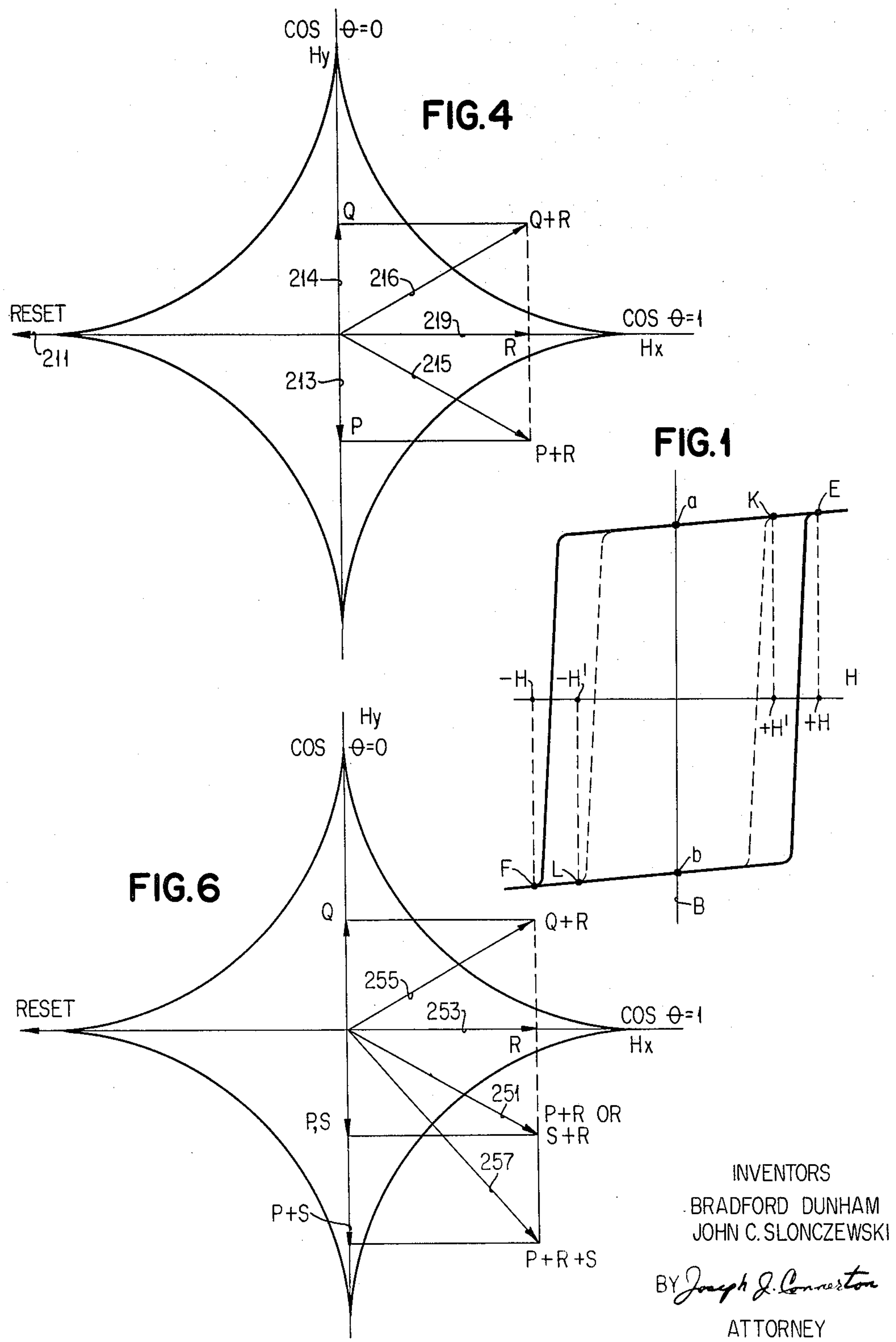
FIG. 1 is a graph illustrating the normal and modified hysteresis characteristics of thin magnetic film.
FIG. 4 is a graph illustrating the critical curve whereby the behavior of thin magnetic film logical devices can be predicted, and further illustrates the operation of the logical device shown in FIG. 2.
FIG. 6 is a graph illustrating the critical curve of the logical device shown in schematic form in FIG. 5.

As is well known in the art, a logical element may be defined as the smallest building block in a computer or data processing machine which can be represented by operators in an appropriate system of symbolic logic. Typical logical elements are the AND circuit, INCLUSIVE and EXCLUSIVE OR circuits, etc. Generally speaking, logical circuits vary in complexity in accordance with the number of variables employed. Thus, for example, there are singularly, binary, ternary and quaternary logical devices or operators designating circuits having one, two, three and four input variables, respectively.

The singularly logical operator is one through which the resulting information is a result of only one variable from that which was presented. The binary logical operator is one through which the resulting information is the result of two variables. Ternary and quaternary logical operators are ones through which the logical output is the result of three and four variables, respectively.

The operation of logical devices of the prior art is well known. For example, vacuum tubes are extensively used to provide switching in data processing systems. A two input logical AND circuit, for example, may comprise a pentode and associated circuitry wherein coincident pulsing of the two grids by the associated variables causes conduction of the tube indicative of the logical resultant. Other logical circuits utilize triode or diode tubes, either singly or in a network, transistors, magnetic cores, etc. However, logical devices of the prior art in addition to being limited to a single logical operation have certain inherent characteristics which adversely effect their operation such as speed, reliability, output signal level, cost, etc.

In view of such limitations, alternative devices for performing logical operations are desirable. As will be more fully described hereinafter, the present invention utilizes the characteristics of thin magnetic film to perform logical operations at a much more rapid rate than comparable devices of the prior art. In accordance with the principles of the present invention, there is provided a multipurpose logical device of thin magnetic film wherein switching takes place by the simultaneous rotation of substantially all magnetic particles or vectors in the film. This phenomenon, hereinafter referred to as rotational switching, contrasts with domain wall switching of conventional magnetic circuits wherein switching is initiated in small regions or domains in the material and, once initiated, progresses through the material until the magnetic material is substantially aligned in the direction of the applied external field. The term "thin film," as herein employed, designates a film having rotational switching characteristics but does not define specific thickness, which may vary within a nominal range of 100–10,000 Angstroms.

From the above description, it will be appreciated that due to the nature of rotation, reversal of magnetization in thin film takes place at a much more rapid rate than domain wall switching. Magnetic film of the type herein employed is so fabricated that it contains a single axis of easy magnetization, this axis consisting of two directions of easy magnetization at an angular displacement of 180°.

In addition to the above described characteristics, a unique phenomenon associated with thin magnetic film is its reaction to a transverse magnetic field. Application of a transverse magnetic field to the thin film produces a substantial reduction in the coercive force switching threshold required for switching the thin film from one direction to the other along the axis of easy magnetization. As herein employed, a transverse magnetic field may be defined as a magnetic field parallel to the plane of the film and in such a direction as to produce a component of predetermined magnitude perpendicular to the easy axis of magnetization of the film.

In the ensuing description, a number of logical circuits will be described including singularly, binary, ternary and quaternary circuits as illustrative of the principle of the subject invention.

The logical operators selected as illustrative of the subject invention together with the symbol designating these circuits are enumerated below.

NOT, which is symbolized (—), provides a logical inversion of a single variable.

AND, symbolized (·), indicates the presence of both variables simultaneously.

OR, sometimes referred to as INCLUSIVE OR, symbolized ($\vee$), indicates the presence of at least one of the variables.

EXCLUSIVE OR, symbolized ($\forall$), indicates the presence of one but not both of the variables.

IF AND ONLY IF, symbolized ($\equiv$), indicates either the presence or absence of both variables.

BUT NOT, sometimes designated NOT IF THEN, symbolized ($\not\supset$), indicates the presence of one particular variable and the absence of the other. It may take two forms depending on which of the variables is the antecedent and which the consequent, since the consequent is dependent on the antecedent.

IF THEN, symbolized ($\supset$), indicates the inverse of NOT IF THEN, i.e., the absence of an output dependent upon the presence of one particular variable and the absence of the other. This operator may also appear in two forms.

While ternary and quaternary logical operators are not generally identified by terminology descriptive of their logical function, they are equally important from a logical viewpoint and their operation is fully described hereinafter.

Referring now to the drawings and more particularly to FIG. 1 thereof, there is illustrated a graph indicating the hysteresis characteristics of thin magnetic film of the type employed in the present invention. As shown, the characteristics are substantially rectangular, resembling the hysteresis characteristics of conventional magnetic cores. The magnetic material has two stable remanence states indictaed by points *a* and *b*, which in the present description arbitrarily designate binary one and binary zero respectively.

The magnetizing force required to switch the thin film element under normal conditions from point *b* to point *a* is represented on the abscissa by +H, while the magnetizing force required to switch from point *a* to point *b* is represented on the abscissa by −H. Considering, for example, a magnetic element having a remanent state indicated by point *b*, application of a magnetic field having a magnetizing force less than the coercive force necessary for switching is ineffective to switch the element from state *b* to state *a*; however, a field of +H magnitude causes the magnetic element to traverse the major hysteresis loop from point *b* to point E, and upon relaxation of this force, to return to the stable remanence state indicated by point *a*. Similarly, if the magnetic element was in a state indicated by point *a*, application of a magnetic field of −H magnitude will cause the magnetic element to traverse the major hysteresis loop from point *a* to point F, and upon removal of this field, to return to the stable remanence state indicated by point *b*.

With respect to thin magnetic film with uni-axial anisotropy, however, application of a transverse magnetic field effectively decreases the width of the hysteresis loop of the thin film material, thereby reducing the threshold field required for switching in a longitudinal direction. The width of the hysteresis loop will be reduced by substantially equal amounts on both sides irrespective of the direction of the transverse field. The hysteresis loop of a thin film element in the presence of a transverse field is indicated in dotted form in FIG. 1. From a comparison of the hysteresis characteristics of thin film within and without the influence of a transverse field, it is apparent that the coercive force required for switching is at a maximum in the absence of a transverse magnetic field and at a minimum under the influence of a transverse field. The switching threshold is reduced by an amount which is a function of the magnitude or intensity of the transverse magnetic field. Thus the magnetizing force required to switch a thin film element under the influence of a transverse field may be made substantially less than the magnetizing force required to switch a magnetic core, for example, having similar normal hysteresis characteristics. The switching thresholds for thin film in the presence of a transverse field are indicated by points K and L, which projected onto the abscissa are indicated by points +H′ and −H′, respectively.

From the above description, it will be appreciated that a coercive force such as shown at +H′ and −H′, when applied in the presence of a transverse magnetic field, will be sufficient to cause switching of the element, but in the absence of a transverse field will be ineffective.

Figure 2:
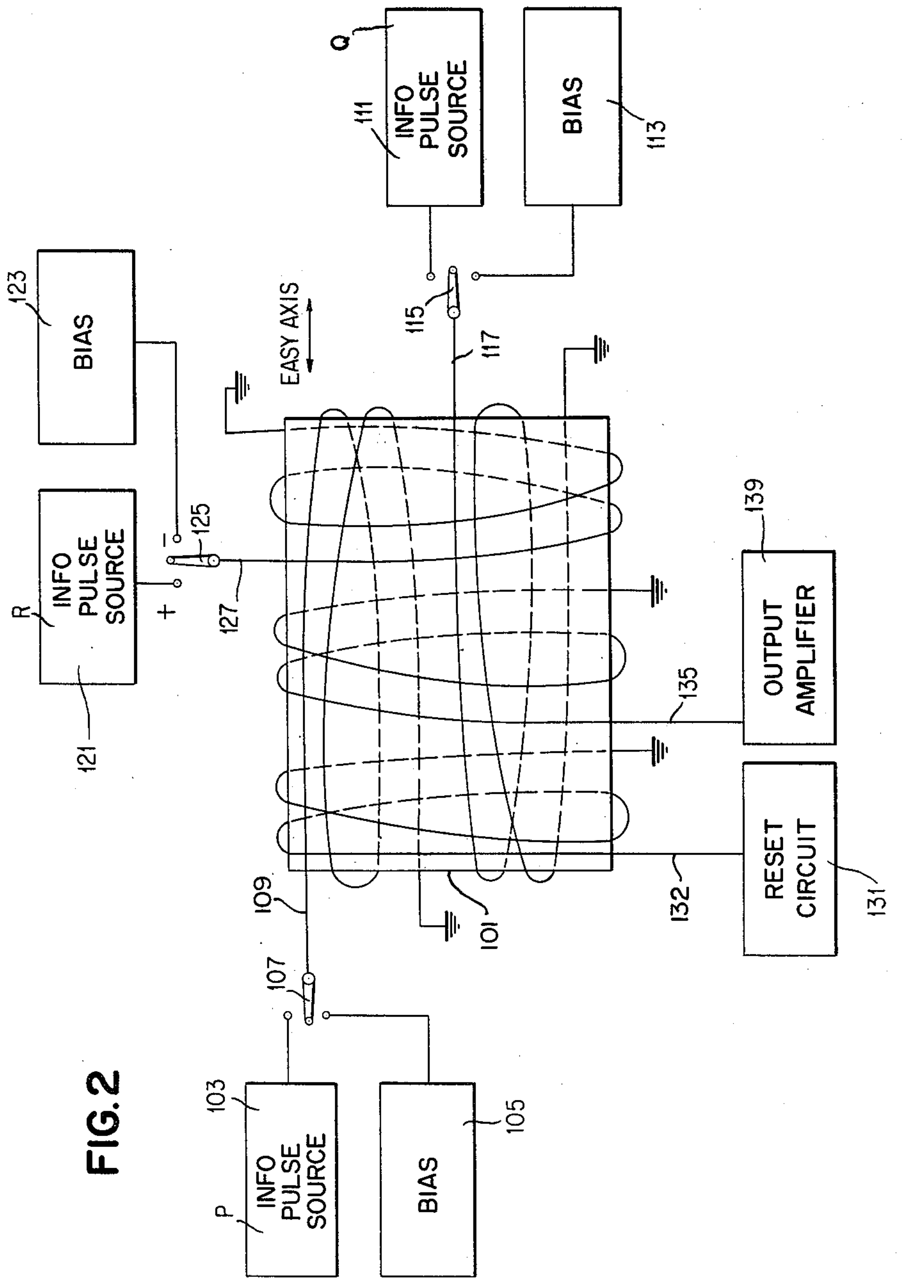
FIG. 2 is a schematic diagram which illustrates a first multipurpose logical device constructed in accordance with the principles of the present invention.

Referring now to FIG. 2 there is illustrated in schematic form a first embodiment of the subject invention. A thin film element comprising a rectangular strip of magnetic film 101 having its easy axis of magnetization in a direction indicated by the arrow has three coils associated therewith. While multiple turn coils are illustrated in FIG. 2 for purposes of clarity, any suitable arrangement capable of producing a field of required direction and intensity may obviously be employed. Although, the thin film element 101 has been shown as rectangular in shape in the preferred embodiment, the shape indicated in FIG. 2 need not correspond precisely to the shape of film strips employed in alternate arrangements of the subject device. The three coils associated with the thin film device are connected to the information pulse sources designated as variables P, Q and R, while a fourth coil is employed to reset the thin film device to a particular state of magnetization. In the particular embodiment herein described, the variables P and Q, identified as pulse sources 103 and 111, are connected through switches 107 and 115 to windings 109 and 117, respectively. The P and Q coils are connected to generate transverse magnetic fields substantially opposite in direction, either field narrowing the hysteresis loop in the manner heretofore described with reference to FIG. 1. However, when both P and Q are simultaneously energized, the resulting fields effectively cancel each other and the hysteresis characteristic of the thin film element remains in its normal or wide state.

The third variable R, shown as pulse source 121, is connected through a switching arrangement 125 to coil 127 and produces, when energized, a magnetic field in a direction along the axis of easy magnetization. In the ensuing description, the presence of signals on variables P, Q or R will be designated as "1," while the absence of signals thereon will be designated as "0." The easy axis of magnetization is arbitrarily illustrated in the drawing as lying in the plane of the film in the directions indicated by the double headed arrow and labeled accordingly, and the two easy directions of magnetization along this axis to the right and left are arbitrarily designated as binary 1 and 0, respectively. Coils 109, 117 and 127 may be selectively energized by either the information sources 103, 111 and 121 or the bias sources 105, 113 and 123, respectively. As herein employed, the term bias refers to either a D.C. signal or a pulse signal which is selectively applied each cycle of the particular logical operation. An output or sense winding 135 is provided to detect a reversal of state of the thin film element. The resulting signal induced in winding 135, when suitably amplified by output amplifier 139, indicates when any reversal of state of the thin film element has occurred and thus indicates the result of the logical operation being performed.

The P and Q information pulse sources 103 and 111 may be any pulse generating circuit which generate pulses of sufficient amplitude to produce substantially equal transverse magnetic fields through associated coils 109 and 117, respectively, of approximate intensity of 0.1 to 0.6 oersted. The P and Q bias sources 105 and 113 may be any circuit for producing a D.C. signal or a pulse signal of sufficient amplitude to produce magnetic field in coils 109 and 117 of the same relative intensity as that produced by pulse sources 103 and 111. The R pulse source 121 may be any pulse generating circuit which generates a pulse of sufficient amplitude to produce a field through coil 127 having an approximate intensity of between 1 and 2 oersteds. The R bias source 123 may be a circuit substantially similar to the P and Q bias sources for producing a D.C. or pulse signal of sufficient amplitude to produce a magnetic field in coil 127 having an intensity of approximately 1–2 oersteds. The reset circuit 131 may be any suitable current source which causes coil 132 to produce a magnetic field of sufficient intensity to drive the thin film element to its zero state. A typical set of magnetic field parameters would be P and Q fields of 0.6 oersted, R field of 1.4 oersteds and reset field of 3.0 oersteds. Output amplifier circuit 139 may be any amplifier which responds to a signal induced in sense winding 135, and is preferably of the type shown in copending application Serial Number 443,284 filed by E. W. Bauer et al. on July 14, 1954, now U.S. Patent 2,889,540.

Correlating FIG. 2 with the hysteresis curve shown in FIG. 1, either P or Q alone, when energized, effectively narrows the hysteresis loop to the condition indicated in dotted form in FIG. 1. R, when energized, produces a magnetizing force indicated on the abscissa as +H′, while the reset winding, when energized, produces a magnetic field having a minimum intensity as that indicated on the abscissa as −H. The normal sequence of operations is initiated with a reset pulse, followed by the logical operation in which the three variables P, Q and R are selectively applied in substantial time coincidence, the only limitation being that the R signal must not be applied prior to P or Q.

In view of the above description, the operation of the present invention in performing the logical operations heretofore defined will now be considered. In the ensuing description it is assumed that the P and Q inputs are so regulated that each taken individually carries either no signal, designated as binary "0," or a signal of a specified magnitude designated as binary "1." Thus there are four possible combinations of P and Q, and the effect of each combination on the hysteresis loop is indicated by Table 1.

*Table 1*

| P | Q | Hysteresis Loop |
|---|---|---|
| 1 | 1 | Wide. |
| 0 | 1 | Narrow. |
| 1 | 0 | Do. |
| 0 | 0 | Wide. |

As heretofore noted, the third variable R, when energized, creates a magnetic field along the axis of easy magnetization in a direction opposite to that created by the reset winding. Assigning R either a "0" or "1," depending on whether no signal or a signal of a predetermined magnitude is applied thereto, the parameters are now so fixed that the multipurpose logical device will be switched to a "1" state if and only if both of the following conditions are realized: (1) R is assigned "1" and (2) the hysteresis loop is in a narrow state by assigning either P or Q a "1." Since the logical state of the film may be sensed or read by conventional means applicable to magnetic recording, the arrangement employing three variables accomplishes the ternary logical function indicated in Table 2.

*Table 2*

| P | Q | R | State of Film |
|---|---|---|---|
| 1 | 1 | 1 | 0 |
| 0 | 1 | 1 | 1 |
| 1 | 0 | 1 | 1 |
| 0 | 0 | 1 | 0 |
| 1 | 1 | 0 | 0 |
| 0 | 1 | 0 | 0 |
| 1 | 0 | 0 | 0 |
| 0 | 0 | 0 | 0 |

In addition to the ternary logical function designated in Table 2, the following full binary logical functions indicated by Tables 3, 4 and 5, may be obtained by biasing one of the three inputs to the "1" or "0" state as indicated below.

The logical AND function · can be obtained by biasing Q to "0" and employing P and R as the variables as indicated in Table 3. Alternatively, the logical AND function can be obtained by biasing P to "0" and employing Q and R as the variables as indicated by Table 4.

*Table 3*

| P | R | · |
|---|---|---|
| 1 | 1 | 1 |
| 0 | 1 | 0 |
| 1 | 0 | 0 |
| 0 | 0 | 0 |

*Table 4*

| Q | R | · |
|---|---|---|
| 1 | 1 | 1 |
| 0 | 1 | 0 |
| 1 | 0 | 0 |
| 0 | 0 | 0 |

Biasing Q to "1," the logical BUT NOT function ($\not\supset$) indicated by Table 5 is obtained. Similarly, biasing P to "1," the logical BUT NOT function indicated by Table 6 is obtained.

*Table 5*

| P | R | $\not\supset$ |
|---|---|---|
| 1 | 1 | 0 |
| 0 | 1 | 1 |
| 1 | 0 | 0 |
| 0 | 0 | 0 |

*Table 6*

| Q | R | $\not\supset$ |
|---|---|---|
| 1 | 1 | 0 |
| 0 | 1 | 1 |
| 1 | 0 | 0 |
| 0 | 0 | 0 |

The logical EXCLUSIVE OR function ∀ indicated by Table 7, is obtained by biasing R to "1."

*Table 7*

| P | Q | ∀ |
|---|---|---|
| 1 | 1 | 0 |
| 0 | 1 | 1 |
| 1 | 0 | 1 |
| 0 | 0 | 0 |

Biasing both R and Q to "1," the only variable input is P and the singularly logical NOT function—indicated by Table 8 is provided.

*Table 8*

| P | — |
|---|---|
| 1 | 0 |
| 0 | 1 |

By selectively biasing the logical device shown in FIG. 2 in the above described manner, a flexible multipurpose logical device capable of performing the above described logical functions is obtained.

Figure 3:
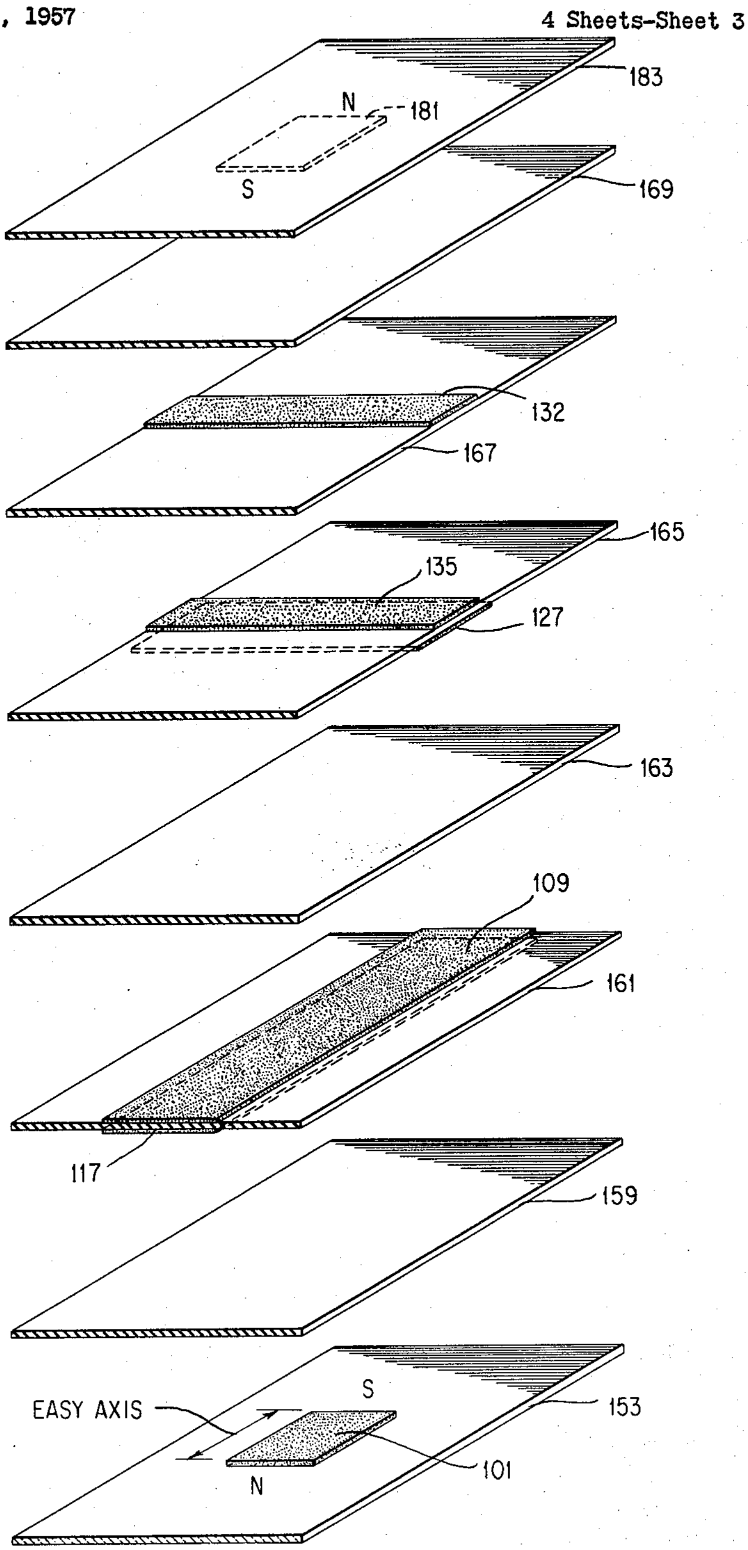
FIG. 3 is an exploded perspective diagram illustrating a preferred construction of the thin film element and associated windings of FIG. 2.

Referring now to FIG. 3, there is illustrated an exploded view of a preferred construction of the magnetic film logical device shown schematically in FIG. 2 utilizing printed circuit techniques. Although the logical device illustrated in FIG. 2 may be fabricated by various methods, it is especially adaptable to multi-layer printed circuit techniques wherein the wiring and insulation materials are successively applied as very thin layers. A layer of thin film 101 is evaporated or otherwise deposited on the surface of a suitable substrate 153. The thin film element may be 0.3 x 0.5 centimeters and approximately 1,000 Angstroms thick, the direction of the axis of easy magnetization being labeled adjacent to the thin film element. The substrate 153 may be glass having a noncritical thickness determined by the desired degree of structural strength. The P and Q coils 109 and 117 comprise single conductors which are insulated from each other by a layer of insulation material 161 and from the thin film element 101 by a layer of insulation material 159. The R coil comprises a single conductor 127 which is suitably insulated from the P conductor 109 by a layer of insulation material 163, and from the sense conductor 135 by another layer of insulation material 165. The reset conductor 132 is insulated from the sense conductor 135 by a layer of insulation material 167. The top layer of the logical device comprises a second thin film element 181 on the lower surface of a glass substrate 183 suitably insulated from the reset conductor 132 by a layer of insulation 169.

The P and Q conductors 109 and 117 are substantially parallel to the axis of easy magnetization of the thin film to provide a transverse magnetic field when energized, while the R and reset conductors 127 and 132 are perpendicular to the axis of easy magnetization to provide, when energized, magnetic fields in the heretofore designated directions along the axis of easy magnetization. The sense conductor is perpendicular to the axis of easy magnetization whereby any reversals in direction of magnetization in the thin film will cause a maximum signal to be induced therein. The P, Q, R and reset conductors are sufficiently wide to overlap the thin film element and may be, for example, 0.6 centimeters wide. The sense conductor 135 may be 0.2 centimeters wide and positioned over the center of thin film element 101.

The above described arrangement may be fabricated in a particular embodiment by the additive process wherein layers of insulation and conductors would be alternately deposited in the above noted sequence. Methods of preparing printed card assemblies such as shown and described generally with reference to FIG. 3 are sufficiently well known in the art that a more detailed description on the fabrication thereof is not required.

From the above description it will be appreciated that the fabrication of logical devices of thin magnetic film is readily adaptable to conventional printed circuit techniques. The thin film elements constitute top and bottom layers of a printed circuit assembly in which the associated conductors and insulation comprise the intermediate layers. The relative sequence of the intermediate layers within the above described arrangement is immaterial, the only requirement being that they be in the indicated direction and electrically insulated from each other and from the thin film elements. Two film strips are employed in the preferred embodiment to diminish demagnetization effects, which for a given film size vary in proportion to the thickness of the thin film. By using two elements, the thickness of the film employed may be increased with a resultant higher output voltage in the sense winding. The direction of magnetization of the two film elements along the axis of easy magnetization for the "1" and "0" states are opposite to enable the magnetic flux generated by the thin film elements to form a closed loop.

A preferred composition of thin film as well as a method of evaporating and annealing the thin film on a substrate is described in copending application 614,654, filed by Lloyd P. Hunter, October 8, 1956 now Patent No. 3,093,818. The film is deposited or annealed under the influence of an external magnetic field to provide the characteristic anisotropy of thin magnetic film.

Referring now to FIG. 4 there is illustrated a graph by means of which the operation of logical elements of thin magnetic film may be predicted. Consider the two magnetic fields employed to control logical operations as $H_x$ and $H_y$, $H_x$ being a magnetic field along the easy axis of magnetization, and $H_y$ being a magnetic field along the transverse axis. Values of $H_x$ to the right and left of the $H_y$ ordinate represent the "1" and "0" states, respectively. As more fully explained hereinafter, values of $H_y$ in either direction along the transverse axis may designate a "1," while the zero state of the corresponding field may be designated by the absence of a vector. The combination of $H_x$ and $H_y$ fields which produce rotational switching of the thin film element is given by the equations:

$$\frac{\partial E}{\partial \theta}=MH_x \sin \theta-MH_y \cos \theta+2K \sin \theta \cos \theta=0 \quad (1)$$

$$\frac{\partial^2 E}{\partial \theta^2}=MH_x \cos \theta+MH_y \sin \theta+2K(\cos^2 \theta-\sin^2 \theta)=0 \quad (2)$$

Solving these equations simultaneously and eliminating $\theta$, the locus of points comprising the graph of FIG. 4 is defined by the equation:

$$H_x^{2/3}+H_y^{2/3}=\frac{(2K)^{2/3}}{M} \quad (3)$$

These points may be considered as critical points relative to determining the magnetic state of the thin film elements, and correspondingly the graph in FIG. 4 may be defined as a critical curve. In the above equations, K is the anisotropy constant in units of oersteds squared or energy per unit volume, while M is the intensity of magnetization in units of oersteds. The angle is the angle of magnetization, i.e., the angular displacement of the orientation of the thin film with respect to the "1" direction along the axis of easy magnetization. It is to be understood that the critical curve of FIG. 4 does not represent actual quantitative values of magnetizing force, but represents in a general way the qualitative variations of the switching threshold for values of $\theta$ from 0° to 360° in units of $2K/M$. Any magnetic field $\vec{H}$ applied to a thin film element will necessarily fall either within or without the critical curve.

Assuming that the thin film is in the "1" or "0" state, if a field having a value $\vec{H}$ within the critical curve is applied and then removed, the element returns to its previous state. On the other hand, where the applied magnetic fields are represented by a point $\vec{H}$ outside the critical curve, the thin film element will be in a state determined by the position of $\vec{H}$. For points to the right of the $H_y$ ordinate outside the critical curve, the element will be in the "1" state, while for points to the left of the $H_y$ ordinate and outside the critical curve, the element will be in the "0" state. Both of these conditions apply irrespective of the previous state of the thin film element.

The graph shown in FIG. 4 could be experimentally constructed by having a device which could vary the intensity and direction of a single magnetic field. Starting in the "0" state and gradually increasing the intensity of the magnetic field applied to the thin film element for different values of $\theta$, the points at which the element switched would form the right side of the critical curve, while the left side would be formed in a substantially identical manner but starting from the "1" state. From FIG. 4 it will be noted that the intensity of the magnetic field along the easy axis of magnetization required to switch the thin film element is a maximum in the absence of a transverse field and decreases with an increase in the transverse field until a theoretical value of zero field along the easy axis of magnetization is required to switch the element under a maximum transverse field. Using a graph of the type shown in FIG. 4, it is possible to predict the operation of logical devices under specific magnetic field conditions and to design such devices to switch under specific values of horizontal and transverse magnetic fields.

Summarizing the above description, the final state of a thin film element can be predicted from a critical curve similar to that shown in FIG. 4. Any variation of $\vec{H}$ within the curve does not disturb the magnetic state of the thin film element, but the element switches when $\vec{H}$ crosses from the inside to the outside of the curve in a direction opposite to the existing state of the element.

To describe the manner in which logical operations may be predicted by means of the critical curve in FIG. 4, the logical "AND" function heretofore described with reference to FIG. 2 will be employed. Referring back to Tables 3 and 4 and using the variables therein employed, it will be noted that biasing P or Q to "0," a "1" output is provided only when both Q and R or both P and R, respectively, are in the "1" state. From the description of FIG. 2, it will be remembered that P and Q, when energized, generate fields substantially transverse to the easy axis of magnetization but 180° out of phase with each other, while R generates a field in the "1" direction along the easy axis of magnetization. The magnetic fields generated by the P and Q variables are shown in FIG. 4 in opposite directions along the $H_y$ axis with respect to each other and displaced 90° with respect to the magnetic field generated by the R variable.

Initially, the thin film element will be set in the zero state by a magnetic field applied to vector 211 labeled "Reset." With Q biased at zero, the four possible conditions for the variables P and R, as shown in Table 3, will be described. With both P and R equal to 1, the resultant $\vec{H}$, $P+R$ is indicated by vector 215. Since vector 215 crosses the critical curve from the inside to the outside in the "one" direction, the resultant output will be "1" as indicated in step one of Table 3. With P equal to 0 and R equal to 1, the condition designated as the second step in Table 3, the resultant $\vec{H}$ is R or vector 219. When $P=1$ and $R=0$, the condition designated as the third step of Table 3, the resultant $\vec{H}$ is P, designated as vector 213. Since vectors 219 and 213 remain within the critical curve, the thin film element remains in the "0" state. Similarly, when both P and R equal 0, the condition designated as step 4 of Table 3, the resultant vector is 0 and the thin film element remains in its reset or "0" state.

In a similar manner, with P biased at 0, the AND condition designated by Table 4, as well as the logical functions (ƀ) shown by Tables 5 and 6, the logical function (∀) shown by Table 7 and the logical function (—) shown by Table 8 can be readily predicted.

Figure 5:
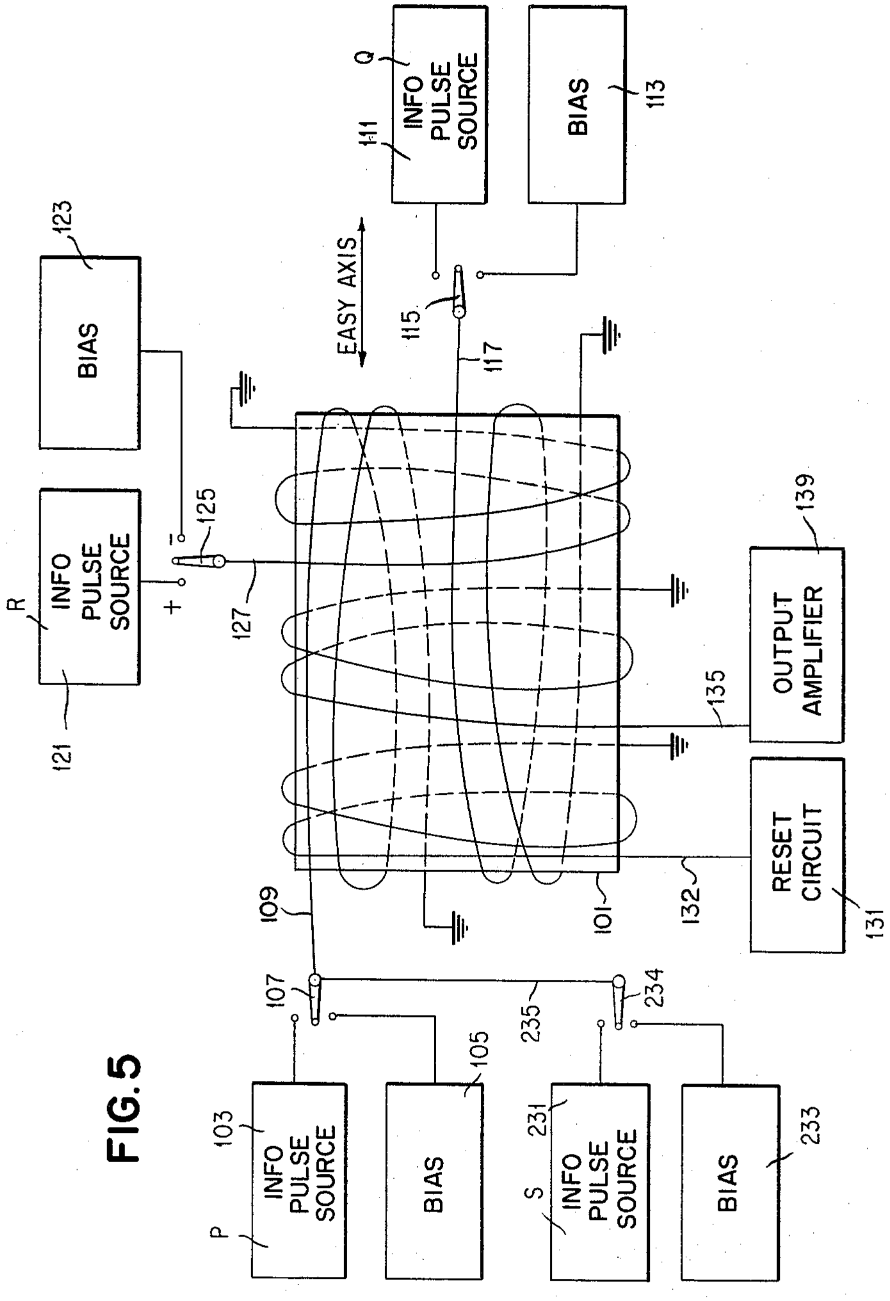
FIG. 5 is a schematic diagram illustrating a second multipurpose logical device constructed in accordance with the principles of the present invention.

Referring now to FIG. 5, there is illustrated a second embodiment of a multipurpose logical device having four variable inputs P, Q, R and S. Since this device is similar to the three input embodiment shown in FIG. 2, identical parts are numbered to correspond to those in FIG. 2. The P information pulse source 103 and its associated bias source 105 together with the S information pulse source 231 and its associated bias source 233 are connected through switches 107 and 234 respectively to selectively generate transverse fields in the same direction when energized. Either P or S sources alone will produce a magnetic field of a given intensity in a predetermined direction, while both together will produce a magnetic field of twice the given intensity in the same direction. The Q information pulse source 111 and its associated bias source 113 is connected through switch 115 to winding 117 and produce a transverse field of the same intensity but in an opposite direction to that of either P or S. The R information pulse source 121 and its associated bias source 123 are connected through switch 125 to a winding 127 which produces a magnetic field along the axis of easy magnetization. The device also includes a reset circuit 131 and an output or sense winding 135 connected to output amplifier 139, all of which function in an identical manner to the embodiment shown in FIG. 2.

By selective biasing of the quaternary inputs P, Q, R and S, the following truth table is obtained.

*Table 9*

| Row | P | Q | R | S | Output |
|---|---|---|---|---|---|
| 1 | 1 | 1 | 1 | 1 | 1 |
| 2 | 0 | 1 | 1 | 1 | 0 |
| 3 | 1 | 1 | 1 | 0 | 0 |
| 4 | 0 | 1 | 1 | 0 | 1 |
| 5 | 1 | 0 | 1 | 1 | 1 |
| 6 | 0 | 0 | 1 | 1 | 1 |
| 7 | 1 | 0 | 1 | 0 | 1 |
| 8 | 0 | 0 | 1 | 0 | 0 |
| 9 | 1 | 1 | 0 | 1 | 0 |
| 10 | 0 | 1 | 0 | 1 | 0 |
| 11 | 1 | 1 | 0 | 0 | 0 |
| 12 | 0 | 1 | 0 | 0 | 0 |
| 13 | 1 | 0 | 0 | 1 | 0 |
| 14 | 0 | 0 | 0 | 1 | 0 |
| 15 | 1 | 0 | 0 | 0 | 0 |
| 16 | 0 | 0 | 0 | 0 | 0 |

The operation of the truth table will be described with reference to the critical curve of FIG. 6, wherein the magnitude of the input variables will be assumed substantially identical to those of FIG. 4.

With respect to the quaternary function shown in Row 1 of Table 9, with P, Q, R and S in the "1" state, Q cancels P or S and the resultant vector 251 in FIG. 6 is equal to $P+R$ or $S+R$ and labeled accordingly. Since a logical operation starts from the reset or zero state, the state of the element is reversed since vector 251 crosses the critical curve. In the second and third rows wherein $P=0$ and 1 and $S=1$ and 0 respectively, Q cancels the effect of P or S, the transverse magnetic field is zero and the resultant magnetic field 253 labeled R remains within the curve. Thus the output in these rows is zero. In Row 4 with P and S equal to 0 and Q equal to 1, the resultant output is vector 255 labeled $Q+R$ which also passes through the critical curve thereby providing a 1 output.

In Rows 5—8, Q is biased to 0 and R to 1. In Row 5, P and S equal 1 so that the resultant vector 257, equal to $P+S+R$ and labeled accordingly, designates a "1." In the sixth and seventh rows wherein $P=0$ and 1 and $S=1$ and 0, respectively, since Q is biased to 0, the resultant output is vector 251 labeled $P+R$ or $S+R$, designating a "1." In the eighth row, with P, S and Q all in the zero state, the resultant output is R, vector 253, which remains within the critical curve and therefore in the 0 state. In the remaining rows, 9 through 16 of Table 9, R, the only magnetic field along the axis of easy magnetization, remains at 0 so that the output consists of various combinations of the transverse components, P, S and Q. Since all possible combinations of these variables remain within the critical curve, a 0 output is provided for Rows 9 through 16.

By judiciously controlling which variables are biased and the direction in which they are biased, it is possible to perform a wide variety of logical functions utilizing the embodiment shown in FIG. 6. By biasing three of the variables, singularly logical functions may be performed by the remaining variable; biasing two of the variables, binary logical functions may be performed; biasing one of the variables, ternary logical functions and utilizing the four inputs as variables, quaternary logical functions may be provided.

To illustrate the principles employed in providing logical functions by means of the embodiment shown in FIG. 5, a limited number of specific logical functions heretofore defined will be described with reference to truth Table 9.

The logical functions ∀, ≡, ⊃, V, ⊛, and ƀ have been selected to illustrate the principle of the present invention. The EXCLUSIVE OR function ∀, for example, is obtained by biasing S to "0" and R to "1" and utilizing P and Q as the variables. It will be seen by examining Rows 3 and 8 of Table 9 that where P and Q are assigned like values, either "1" or "0," the resultant output is "0." On the other hand, where P and Q are assigned unlike values, either "1" or "0," as shown in Rows 4 and 7, the output is "1."

The logical function IF AND ONLY IF (≡) is obtained where Q and R are both biased one and P and S serve as variable inputs. This may be seen by examining Rows 1 through 4 of Table 9. Where P and S are assigned like values, that is, both one or both zero, as in Rows 1 and 4, the resultant output in both cases is one. Where P and S are assigned opposite values, the resultant output is zero.

The logical function IF THEN (⊃) may be obtained by biasing S to 1 and R to 1. It will be observed that the function ⊃ with Q as the antecedent and P the consequent is obtained from Rows 1, 2, 5 and 6 of Table 9. A zero output is obtained only at Row 2 where Q is assigned one and P is assigned zero.

The logical OR function V is obtained where R is biased 1 and Q is based 0. This may be observed from Rows 5 through 8 of Table 9. A "1" is obtained as an output when either P or S or both are assigned 1 and a 0 output is obtained only in that a case where both P and S are assigned 0, the condition indicated in Row 8.

The logical function AND (⊛) may be obtained by biasing both S and Q 0 and utilizing P and R as the input variables. This condition is shown in Rows 7, 8, 15 and 16 of Table 9. A "1" is obtained as an output only where both P and R are assigned 1 as indicated in Row 7.

The logical function NOT IF THEN (⊅) is obtained where S is biased 0 and Q is biased 1. This condition is shown in Rows 3, 4, 11 and 12 of Table 9. A "1" output, as indicated in Row 4, is obtained only in that case where 0 is assigned to P and 1 is assigned to R.

From the above description it is apparent that a wide diversity of logical functions may be obtained from the arrangement described in FIG. 5. That arrangement because of the relative magnitudes of signal and bias inputs gave rise to the quaternary function in Table 9. It will be apparent to one skilled in the art that by varying the amplitude level of the input variables, more complex logical operators can be derived. For example, the P, Q, R or S inputs could comprise a summation or resultant of two or more variables, these variables in turn performing a logical function in addition to their function as a single input to the quaternary logical device.

From the ensuing description it will be apparent to one skilled in the art that a whole class of multipurpose logical devices can be devised, each device in the class in turn capable of providing a plurality of logical functions.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention therefore, to be limited only as indicated by the scope of the following claims.

What is claimed is:

1. A multipurpose device for selectively performing one of a plurality of logical functions comprising an element of thin magnetic film having uniaxial anisotropy and exhibiting substantially rectangular hysteresis characteristics, energizing means representing a first variable for generating a magnetic field along an axis of preferred magnetization of said element, energizing means representing a second variable for generating a magnetic field along an axis substantially transverse to said axis of preferred magnetization, energizing means representing a third variable for generating a magnetic field along an axis substantially transverse to said axis of preferred magnetization but in a direction opposite to that of said second variable, first, second and third bias means associated with said first, second and third variables respectively, and means for actuating selectively and collectively said energizing means and said bias means in accordance with the particular logical function being performed.

2. A multipurpose logical device comprising a magnetic element of uniaxial anisotropy capable of assuming stable remanence conditions, energizing means for applying magnetomotive forces to said element along said axis, energizing means for applying a magnetomotive force to said element in a first direction along an axis substantially transverse to said axis, energizing means for applying a magnetomotive force to said element in a direction opposite to said first direction along said transverse axis, means for actuating said energizing means selectively and collectively in accordance with the logical function being provided and sensing means for detecting the logical resultant of said logical function.

3. A device for directly providing a plurality of logical switching functions comprising a thin magnetic film element having an axis of easy magnetization wherein the directions of magnetization along said axis designate stable remanence conditions, first means for applying a magnetomotive force to said element along said axis in a first direction, second means for applying a magnetomotive force to said element along said axis in an opposite direction, third means for applying a magnetomotive force to said element in a first direction along an axis substantially transverse to said axis, fourth means for applying a magnetomotive force to said element in a second direction along an axis substantially transverse to said axis and means for selectively and collectively rendering said first, second, third and fourth means operative in accordance with the particular logical function being provided.

4. A multipurpose logical device for selectively providing one of a plurality of logical functions comprising a thin film of magnetic material having an axis of preferred magnetization and capable of assuming two stable remanence conditions along said axis, means for generating a first magnetic field along one of said directions of preferred magnetization, the magnitude of said field being less than the normal switching threshold of said magnetic material, means for generating a second magnetic field along the other direction of said axis of preferred magnetization, means for generating a first magnetic field having a direction transverse to said axis of preferred magnetization and means for generating a second magnetic field having a direction transverse to said axis of preferred magnetization, said first and second transverse magnetic fields being opposite in direction and means for selectively and collectively generating said first and second magnetic fields whereby either of said transverse fields effectively lowers the switching threshold of said thin film to a level such as to permit switching of said device in response to said first magnetic field.

5. A multipurpose logical device comprising a magnetic element having a bi-directional axis of easy magnetization wherein the direction of magnetization along said axis indicates one of two remanence conditions, means for generating magnetic fields along said axis of easy magnetization, means for generating magnetic fields along a bi-directional axis substantially transverse to said axis of easy magnetization and means for performing logical operations by selectively and collectively applying said magnetic fields to said magnetic element, the direction and intensity of said magnetic fields being determined in accordance with the logical operation to be performed and the direction of magnetization of said element along said axis of easy magnetization defining the logical resultant of said logical operation.

6. A multipurpose logical device capable of providing a multiplicity of logical operations on information having a particular number of variables comprising in combination a magnetic element capable of assuming stable remanence conditions and having a bi-directional axis of easy magnetization, means for generating magnetic fields along said axis of easy magnetization in response to signals representative of one of said input variables or associated bias sources, means for generating magnetic fields along a bi-directional axis substantially transverse to said axis of easy magnetization in response to signals representative of a second of said input variables or associated bias sources and means for selectively and collectively rendering said means operative in response to said input variable signals or said associated bias sources in accordance with the logical operation to be provided.

7. A multipurpose logical device comprising an anisotropic magnetic element exhibiting an easy axis of magnetization defining opposite stable states of remanent flux orientation, said element having a plurality of inputs coupled thereto and capable of realizing at least one logical operator of a system of variables equal to said plurality of inputs, output means coupled to said magnetic element, biasing means selectively connected to said inputs, information introduction means selectively connected to said inputs and means responsive to the selective and collective energization of said inputs by said biasing means and information introduction means for sensing the resulting information appearing at said output means.

8. A multipurpose logical device capable of a multiplicity of logical operations on information having a predetermined number of variables, comprising a thin film of magnetic material having an axis of easy magnetization, the direction of magnetization along said axis indicating one of two stable remanence conditions, a number of inputs connected to said device, said device being capable of realizing at least one logical operator of the systems of variables equal to and less than said number of inputs, biasing and information introduction means selectively coupled to said inputs, means for selectively and collectively actuating said information introduction means and said biasing means whereby the resulting direction of magnetization of said magnetic material along its axis of easy magnetization is indicative of the logical resultant of said logical operator and output sensing means for detecting said direction of magnetization indicative of said logical resultant.

9. A multipurpose logical device comprising a magnetic element of uniaxial anisotropy having an axis of easy magnetization, a plurality of windings coupled to said device, information introduction means selectively coupled to said plurality of windings, biasing means selectively coupled to said plurality of windings and means for collectively and selectively energizing said plurality of windings with said information introduction means and said biasing means to selectively generate alternate magnetic fields along said axis of easy magnetization and along an axis substantially transverse thereto whereby the coincidence of certain of said fields during a particular logical operation causes said element to assume a direction along its axis of easy magnetization indicative of a logical resultant.

10. A multipurpose logical device capable of providing quaternary, ternary, binary and singularly logical functions comprising an element of thin magnetic film capable of assuming stable remanence conditions along an axis of easy magnetization, energizing means for producing a magnetic field along said axis of easy magnetization, energizing means for producing a magnetic field in an opposite direction along said axis of easy magnetization, energizing means for producing a magnetic field along an axis transverse to said easy axis of magnetization, energizing means for producing a magnetic field in an opposite direction along said transverse axis, said energizing means including signal and bias producing means selectively coupled to said element whereby the logical function to be provided is determined by said bias producing means and the logical operation is controlled by the variables identified by said signal producing means, the resultant of said logical operation being indicated by the direction of magnetization of said element along said axis of easy magnetization.

11. A multipurpose binary logical device for selectively providing one of a plurality of binary logical functions in response to input signals representing a first and second variable comprising in combination an element of thin magnetic film having a bi-directional axis of easy magnetization defining opposite stable states of remanent flux orientation wherein the direction of magnetization along said axis designates the resultant of the logical operation being provided, first and second energizing means for producing magnetic fields in opposite directions along said axis of easy magnetization, third and fourth energizing means for producing magnetic fields in opposite directions along an axis substantially transverse to said axis of easy magnetization, means for selectively and collectively actuating said energizing means in accordance with said input variables and signal biasing means to provide a particular logical function and sensing means for detecting the direction of magnetization of said element.

12. A multipurpose logical device for selectively providing ternary logical functions for a plurality of input variables each having an associated bias source, comprising in combination a thin magnetic film element capable of assuming stable remanence conditions along an axis of easy magnetization, the switching threshold of said element being substantially reduced under the influence of a transverse magnetic field, energizing means for providing a magnetomotive force along one direction of said easy axis of magnetization, energizing means for providing a magnetomotive force in an opposite direction along said axis of easy magnetization, energizing means for providing magnetomotive forces in opposite directions along an axis substantially transverse to said axis of easy magnetization and means responsive to the input variables and associated bias sources for selectively and collectively actuating said energizing means in accordance with the logical ternary function to be provided.

13. A multipurpose device for manifesting quaternary logical switching on at least four input variables comprising a thin film of magnetic material capable of assuming stable remanence conditions along an axis of easy magnetization, the switching threshold of said magnetic material being substantially reduced when subjected to the influence of a transverse magnetic field, means for generating a magnetic field transverse to the axis of easy magnetization weighted in accordance with the signals applied to three of said variables, means for generating a magnetic field in a predetermined direction along said axis of easy magnetization in accordance with a fourth variable and means responsive to the selective and collective application of said variables to said magnetic field generating means in accordance with the logical function being provided for producing combinations of magnetic fields which magnetize said magnetic material in a particular direction indicative of the logical resultant of said function.

References Cited in the file of this patent

UNITED STATES PATENTS

| | | |
|---|---|---|
| 2,691,155 | Rosenberg | Oct. 5, 1954 |
| 2,869,112 | Hunter | Jan. 13, 1959 |
| 3,030,612 | Rubens et al. | Apr. 17, 1962 |

OTHER REFERENCES

Blois: "Preparation of Thin Magnetic Films and Their Properties," Journal of Applied Physics, vol. 26, No. 8, August 1955, pages 975–980.

Wakeman: "Superposed Magnetic Fields in Materials With Rectangular Hysteresis Loops," A.I.E.E. Transactions, vol. 75, pt. 1, issued Nov. 27, 1956, pages 562–9, #64–A.

Publication: "Nondestructive Sensing of Magnetic Cores" (Buck), January 1954, Communications and Electronics, pages 822–830.

"A Compact Coincident Current Memory," A. V. Pohm, S. M. Rubens, Proceedings of Eastern Joint Computer Conference, Dec. 10–12, 1956, pp. 120–123.